(12) United States Patent
Nagai et al.

(10) Patent No.: US 12,229,789 B2
(45) Date of Patent: Feb. 18, 2025

(54) PURCHASING ANALYSIS SYSTEM, PURCHASING ANALYSIS METHOD, AND COMPUTER PROGRAM

(71) Applicant: SHIRUSHI INC., Tokyo (JP)

(72) Inventors: Hideoki Nagai, Tokyo (JP); Yoshiro Shimoda, Tokyo (JP); Hiroto Takeno, Kanagawa (JP)

(73) Assignee: SHIRUSHI INC., Tokyo (JP)

( * ) Notice: Subject to any disclaimer, the term of this patent is extended or adjusted under 35 U.S.C. 154(b) by 90 days.

(21) Appl. No.: 17/680,473

(22) Filed: Feb. 25, 2022

(65) Prior Publication Data

US 2022/0284455 A1    Sep. 8, 2022

(30) Foreign Application Priority Data

Mar. 3, 2021 (JP) .................................. 2021-033829
Dec. 22, 2021 (JP) .................................. 2021-208430

(51) Int. Cl.
  *G06Q 10/00*       (2023.01)
  *G06Q 30/0201*    (2023.01)

(52) U.S. Cl.
  CPC ............................... *G06Q 30/0201* (2013.01)

(58) Field of Classification Search
  None
  See application file for complete search history.

(56) References Cited

U.S. PATENT DOCUMENTS

| | | | |
|---|---|---|---|
| 7,769,648 B1* | 8/2010 | Nolan ............... | G06Q 30/0633 705/28 |
| 8,219,438 B1* | 7/2012 | Moon ............... | G06Q 30/0204 705/7.29 |
| 10,176,513 B1* | 1/2019 | Koka ..................... | G06F 3/011 |
| 2004/0093268 A1* | 5/2004 | Ramchandani ........ | G06Q 30/02 705/14.13 |
| 2006/0242154 A1* | 10/2006 | Rawat ................... | G06F 16/168 |
| 2009/0106108 A1* | 4/2009 | Ku ........................ | G06Q 30/02 705/14.54 |

(Continued)

FOREIGN PATENT DOCUMENTS

| | | |
|---|---|---|
| JP | 2002123670 A | 4/2002 |
| JP | 2009245425 A | 10/2009 |

(Continued)

OTHER PUBLICATIONS

AG Greenwald, C Leavitt (Audience involvement in advertising: Four levels) Journal of Consumer research, 1984—academic.oup.com). (Year: 1984).*

*Primary Examiner* — Hafiz A Kassim
(74) *Attorney, Agent, or Firm* — WCF IP

(57) ABSTRACT

In order to analyze the purchasing situation from the various kinds of information regarding the products sold on the mall style shopping site, a purchasing analysis system for analyzing purchase status of a target product sold on a mall style shopping site has a trading history acquisition unit acquiring information related to a trading history of the target product on the mall style shopping site. The system also has an advertising information acquisition unit acquiring advertising indicators of the target product. Further, the system has an output unit displaying the information related to the trading history and the advertising indicators on a same time axis.

9 Claims, 8 Drawing Sheets

(56) References Cited

U.S. PATENT DOCUMENTS

| | | | | |
|---|---|---|---|---|
| 2011/0208585 A1* | 8/2011 | Daboll | ............... | G06Q 10/00 709/224 |
| 2012/0191542 A1* | 7/2012 | Nurmi | ............... | G06Q 30/0256 705/14.54 |
| 2012/0303411 A1* | 11/2012 | Chen | ............... | G06Q 10/087 705/7.31 |
| 2013/0138673 A1* | 5/2013 | Uemura | ............ | H04N 21/4788 707/E17.014 |
| 2014/0214568 A1* | 7/2014 | Argue | ............. | G08B 13/19613 705/18 |
| 2014/0280107 A1* | 9/2014 | Heymans | ............ | G06F 16/9535 707/723 |
| 2016/0094670 A1* | 3/2016 | Garcia Manchado | ..................... | G06F 11/3438 709/217 |
| 2016/0335693 A1 | 11/2016 | Lin et al. | | |
| 2017/0039877 A1* | 2/2017 | Gimenez Molinelli | ..................... | G16H 50/20 |
| 2017/0337602 A1* | 11/2017 | Davis | ................... | G06V 40/174 |
| 2017/0357999 A1 | 12/2017 | Shin et al. | | |
| 2018/0136633 A1* | 5/2018 | Small | ................... | G06Q 30/018 |
| 2019/0279254 A1* | 9/2019 | Wai | ................... | G06Q 30/0247 |
| 2019/0384857 A1* | 12/2019 | Nguyen | ............... | G06F 16/951 |
| 2020/0265396 A1* | 8/2020 | Chirakan | ............... | G06Q 20/18 |

FOREIGN PATENT DOCUMENTS

| | | | | |
|---|---|---|---|---|
| JP | 2012-89014 A | 5/2012 | | |
| JP | 2013167915 | 8/2013 | | |
| JP | 2017-117068 | 6/2017 | | |
| JP | 2017-188031 A | 10/2017 | | |
| JP | 2019114203 A | 7/2019 | | |
| JP | 2020-4050 A | 1/2020 | | |
| JP | 20201484260 | 1/2020 | | |
| JP | 2020-126566 A | 8/2020 | | |
| WO | WO-2007128057 A1 * | 11/2007 | ............ | G06Q 30/02 |
| WO | WO-2010060146 A1 * | 6/2010 | ........ | G06K 9/00281 |
| WO | 2015162719 A | 10/2015 | | |

\* cited by examiner

FIG. 8

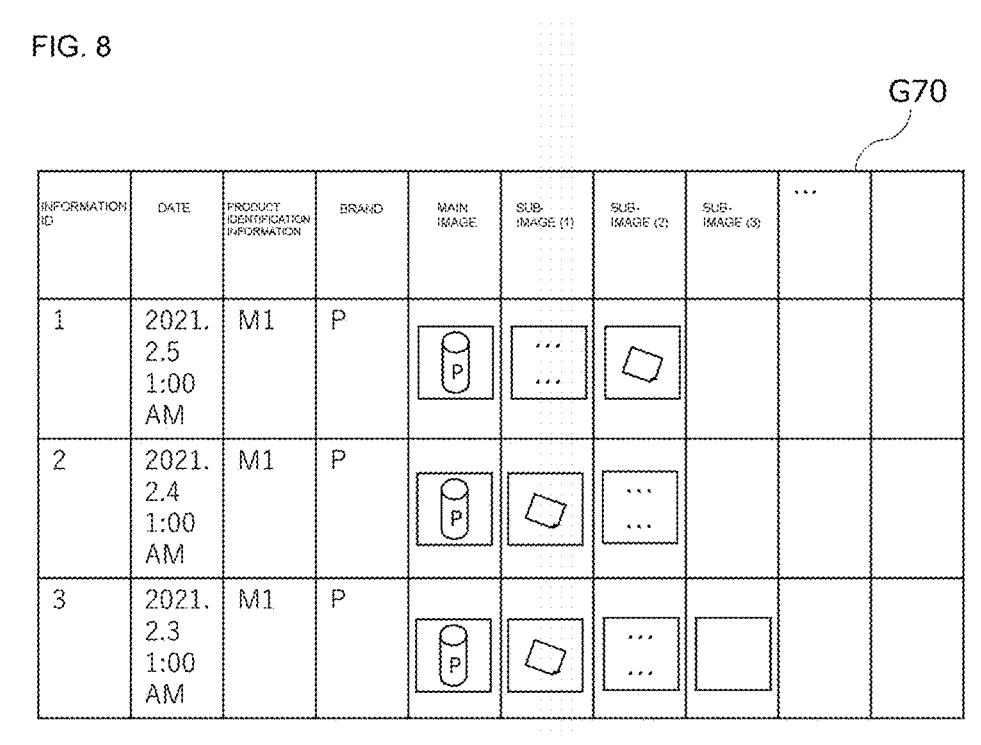

| INFORMATION ID | DATE | PRODUCT IDENTIFICATION INFORMATION | BRAND | MAIN IMAGE | SUB-IMAGE (1) | SUB-IMAGE (2) | SUB-IMAGE (3) | ... | G70 |
|---|---|---|---|---|---|---|---|---|---|
| 1 | 2021.2.5 1:00 AM | M1 | P | [P] | ... | ◇ | | | |
| 2 | 2021.2.4 1:00 AM | M1 | P | [P] | ◇ | ... | | | |
| 3 | 2021.2.3 1:00 AM | M1 | P | [P] | ◇ | ... | | | |

PURCHASING ANALYSIS SYSTEM, PURCHASING ANALYSIS METHOD, AND COMPUTER PROGRAM

The present application is based on, and claims priority from, JP Application Serial Number 2021-33829, filed on Mar. 3, 2021, and JP Application Serial Number 2021-208430, filed on Dec. 22, 2021, the disclosure of which are hereby incorporated by reference herein their entirety.

TECHNICAL FIELD

The present invention relates to a purchasing analysis system, a purchasing analysis method, and a computer program

BACKGROUND

Mall style shopping sites on the Internet where many sellers sell various products under the same domain are known in the art. A manager of the mall style shopping site, for example, manages the product pages, sales, and the like of a plurality of sellers in an integrated manner. A seller of the mall style shopping site can utilize it for sales policy and product development by considering situations such as purchasing tendencies and the like on the site. However, information that the seller can obtain from tools prepared by the manager of the mall style shopping site in advance is limited, and it is difficult to analyze purchasing situations from various kinds of information.

JP2020-126566A (Japanese Unexamined Patent Publication) discloses a device for analyzing changes in purchasing behavior of users depending on a display state of products on a mail-order site in the web marketing. JP2017-188031A (Japanese Unexamined Patent Publication) discloses remarketing method and system based on behavior data and emotion data that can more accurately utilize movements of users by combining the user's behavior data and the emotion data that can be read from the screen operation. JP2012-89014A (Japanese Unexamined Patent Publication) discloses a device for generating marketing data by receiving Web browsing data collected from a user terminal, extracting commodity information from the Web browsing data, and performing statistical processing and visualization processing.

SUMMARY OF INVENTION

Technical Problem

One of the object of the present invention is to analyze the purchasing situation and the like from the various kinds of information regarding the products sold on the mall style shopping site.

Solution to Problem

In order to achieve the above objects, a purchasing analysis system according to one aspect of the present invention is a system for analyzing purchase status of a target product sold on a mall style shopping site. The system includes a trading history acquisition unit acquiring information related to a trading history of the target product on the mall style shopping site, an advertising information acquisition unit acquiring advertising indicators of the target product, and an output unit displaying the information related to the trading history and the advertising indicators on a same time axis.

The advertising information acquisition unit may acquire the advertising indicators at the same time as a timing of acquiring the information related to the trading history by the trading history acquisition unit.

The purchasing analysis system may further include an attention level information acquisition unit acquiring numbers of searches for information related to the target product on search engines or numbers of posts by general consumers with times of Day as an indicator of an attention level of the target product on the Internet. Moreover, the output unit may display the attention level and the information included in the trading history on a same time axis.

The output unit may display the attention level and the advertising indicators on a same time axis.

The attention level information acquisition unit may acquire the attention level of various words corresponding to the target products and calculate the attention level for each of the various words.

The output unit may display sales amount of the target product for each region based on information of a residential area of a purchaser of the target product included in the trading history.

The purchasing analysis system may further include an analyzer analyzing purchase status of the target product based on at least the trading history and the advertising indicators. Moreover, the analyzer may calculate an advertisement cost effectiveness of the target product based on the trading history and the advertising indicators.

The purchasing analysis system may further include an advertising information storage storing advertisement of the target product. In addition, the advertising information storage may store the advertisement in association with the campaign to which the advertisement belongs. Further, the analyzer may extract the advertising indicators and calculates an advertisement cost effectiveness of the target product for each of the campaign.

In order to achieve the above objects, a purchasing analysis system according to another aspect of the present invention is a system for analyzing purchase status of a target product sold on a mall style shopping site. The purchasing analysis system includes a purchase screen information acquisition unit periodically acquiring purchase screen information displayed on a purchaser terminal by a mall management server managing the mall style shopping site. In addition, the purchasing analysis system includes an output unit notifies a user terminal when a change on the purchase screen is detected.

In order to achieve the above objects, a purchasing analysis method according to another aspect of the present invention is a method that a computer analyzes purchase status of a target product sold on a mall style shopping site. The method includes steps of acquiring information related to a trading history of the target product on the mall style shopping site, acquiring advertising indicators of the target product, and displaying the information related to the trading history and the advertising indicators on a same time axis.

In order to achieve the above objects, a purchasing analysis method according to another aspect of the present invention is a method that a computer analyzes purchase status of a target product sold on a mall style shopping site. The method includes steps of periodically acquiring purchase screen information displayed on a purchaser terminal by a mall management server managing the mall style shopping site, and notifying a user terminal when a change on the purchase screen is detected.

In order to achieve the above objects, a non-transitory computer-readable storage medium according to another aspect of the present invention stores a computer-executable program for analyzing purchase status of a target product sold on a mall style shopping site. The program includes instructions for acquiring information related to a trading history of the target product on the mall style shopping site, instructions for acquiring advertising indicators of the target product, and instructions for displaying the information related to the trading history and the advertising indicators on a same time axis.

In order to achieve the above objects, a non-transitory computer-readable storage medium according to another aspect of the present invention stores a computer-executable program for analyzing purchase status of a target product sold on a mall style shopping site. The program includes instructions for periodically acquiring purchase screen information displayed on a purchaser terminal by a mall management server managing the mall style shopping site, and instructions for notifying a user terminal when a change on the purchase screen is detected.

The computer executable program can be provided by downloading via a network such as the Internet, or can be recorded and provided on various computer readable recording media.

Effect of the Invention

According to the present invention, the purchasing situation or the like can be analyzed from various kinds of information regarding the products sold on the mall style shopping site.

BRIEF DESCRIPTION OF DRAWINGS

FIG. 8 is an example of a result screen displayed by the purchase analysis system mentioned above.

PREFERRED EMBODIMENT

Overview

A purchase analysis system according to an embodiment of the present invention will be described below with reference to the drawings. In the purchase analysis system according to the present embodiment acquires information related to a product sold on a mall style shopping site hereinafter, also referred to as a "target product") from a plurality of tools to perform analysis processing and outputs results. The purchase analysis system is a system that can be used by retailers selling products on the mall style shopping site, as well as by manufacturers and wholesalers wholeselling products to distributors. In the following description, such users may be collectively referred to as users of this system.

Figure 1:
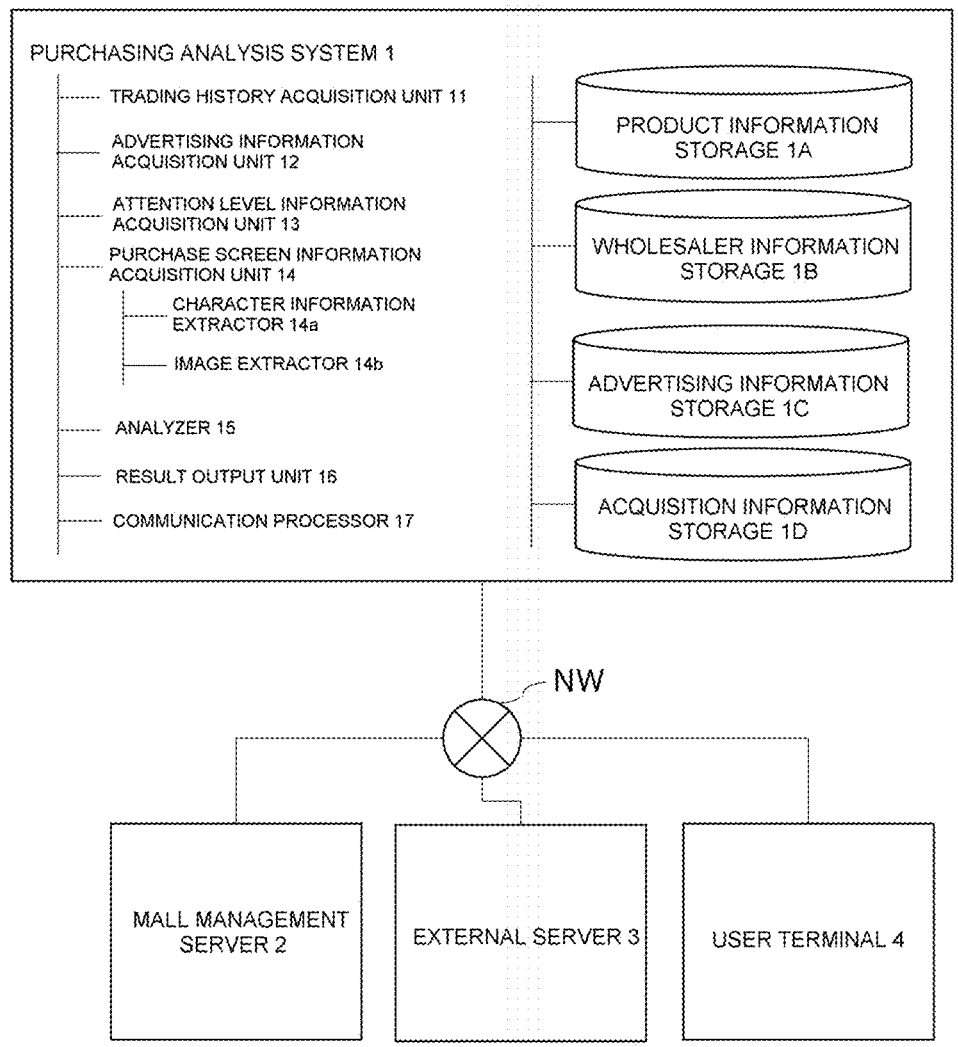
FIG. 1 is a functional block diagram illustrating a configuration and a function of a purchase analysis system according to an embodiment of the present invention.

As illustrated in FIG. 1, a purchase analysis system 1 is communicatively connected to a mall management server 2, an external server 3, and a user terminal 4 via a network NW. The mall management server 2 is a server for managing a mall style shopping site. The mall managing server 2, for example, accepts a plurality of products from a plurality of sellers for lists. Further, the mall managing server 2 manages a purchase screen of a listed product, and displays the purchase screen to a purchaser terminal in response to an operation of the purchaser terminal. The mall management server 2 manages information of the products purchased through the mall style shopping site and information on purchasers who have purchased.

The external server 3 is a server that can acquire information related to the product on the Internet, and is, for example, a server to manage a search engine. The external server 3 acquires and stores a number of hourly searches for information related to the product on the search engines under its management. Further, the external server 3 may store date, time, a number of times, and the like, posted on a specific SNS (Social Networking Service). Although one external server 3 is illustrated in the figure, the purchase analysis system 1 may be capable of communicating with a plurality of external servers 3 via the network NW.

The information related to the product is not limited to a product name, and includes various phrases indicating the product such as an abbreviation of the product name, a nickname, a manufacture name, and a catch phrase of the product.

The user terminal 4 is a terminal used by a retailer who sells the product on the mall style shopping site or a manufacture or a wholesaler who wholesales the product to the sellers, and receives and displays analysis results by the purchase analysis system 1.

The purchase analysis system 1 may be realized by executing a predetermined computer program, for example, in a personal computer, a tablet computer, a smartphone, or the like, and a part or a whole of functions may be realized by a cloud computer. Further, the purchase analysis system may be composed of a plurality of hardware configurations.

The purchase analysis system 1 is, for example, realized by a computing device such as a CPU (Central Processing Unit), a computer program executed by the CPU, a server having an internal memory such as RAM (Random Access Memory) and ROM (Read Only Memory), and the like. As a result, the purchase analysis system 1 mainly constitutes functional blocks including a trading history acquisition unit 11, an advertising information acquisition unit 12, an attention level information acquisition unit 13, a purchase screen information acquisition unit 14, an analyzer 15, a result output unit 16, a communication processor 17, a product information storage 1A, a wholesaler information storage 1B, an advertising information storage 1C, and an acquisition information storage 1D.

The trading history acquisition unit 11 is a functional unit to acquire a trading history of the product from the mall management server 2 via the communication processor 17. The trading history includes, for example, information related to identification information of sold products, a number of purchases, a number of products, selling prices, shipping costs, shipping agents, shipping methods, date and time of sale, and purchasers. Further, the trading history may include information related to products purchased at the same time on the mall style shopping site.

The information related to the purchaser included in the trading history may be, for example, an attribute of the purchaser including a residential area or a shipping area, gender, age of the purchaser. Further, the information related to the purchaser include a purchase history on the mall style shopping site and may have information that can determine whether the purchaser is a new purchaser or a repeat purchaser.

Furthermore, the trading history may include information on whether a form of purchasing the product is a one-off purchase application or a subscription application. In addition, the trading history may include whether a coupon has been used and types of a coupon used. Further, the trading history may include information on whether the product has been purchased as a gift.

The trading history acquisition unit 11 may acquire a so-called time sale time zone in which the selling price is temporarily reduced in a predetermined time zone. This is because the indication that the time sale is in progress may be displayed in a conspicuous manner on the purchase screen in addition to changes of the selling price during the time zone of the time sale, and the indication has a sales promotion effect different from a mere reduction.

Further, the trading history acquisition unit 11 may acquire seller information of the sold products as the trading history. In a case of the mall style shopping site, a plurality of sellers may list products having the same identification information. Each of the sellers may be able to set different selling prices and shipping costs for the same product. The purchaser can purchase the product by designating the seller to purchase. In such a situation, the trading history acquisition unit 11 acquires the seller information of the sold products together, thereby it is easy for the manufactures or the whole salers to analyze distributions of the products.

The trading history acquisition unit 11 may acquire the trading history from the mall management server 2 by using an API (Application Programming Interface) provided by a manager of the mall management server 2 or an API provided by a third party. The trading history acquisition unit 11 may periodically acquire the trading history, or may acquire the trading history when a trade is performed.

The advertising information acquisition unit 12 is a functional unit to acquire advertising indicators (hereinafter, also referred to as an "ad indicator") related to the target product via the communication processor 17. The advertising information acquisition unit 12 acquires, for example, IMP (impression, a number of advertisement exposures, or a number of impressions), CT (a click through or a number of clicks on an advertisement), and the like, for each advertisement. The advertising information acquisition unit 12 acquires the indicator from the mall management server 2. The advertising information acquisition unit 12 may also acquire the ad indicator of the advertisement posted on sites other than the mall style shopping site. This information may include, for example, IMP and CT in other advertising media, such as blogs.

The advertising information acquisition unit 12 periodically acquires the ad indicator. A timing of the acquisition by the advertising information acquisition unit 12 may be the same as a timing of the acquisition by the trading history acquisition unit 11. The trading history acquisition unit 11 and the advertising information acquisition unit 12 can align the time axis to analyze the trading history and the ad indicator by acquiring a point of a time acquiring the information in accordance with each information.

The attention level information acquisition unit 13 is a functional unit to acquire information related to an attention level of the target product on the Internet via the communication processor 17. The attention level information acquisition unit 13 acquires from the external server 3, for example, the attention level of the target product on web sites, which is released separately from information intentionally exposed by the seller, the manufacture, such as a number of searches for information related to the product on search engines per hour, or dates and a number of times posted by general consumers on a specific SNS (social network service). Similar to the trading history acquisition unit 11 and the advertising information acquisition unit 12, the attention level information acquisition unit 13 acquires a point of a time acquiring the information in accordance with each information, and can align the time axis to analyze the trading history and the ad indicator, and the information from the external server 3. Further, the attention level information acquisition unit 13 may acquire attention levels of various words corresponding to the product, such as an abbreviation of the product name, a nickname, a manufacturer name, an advertising slogan of the product, various phrases that indicates the product and the like, other than the product name, and the attention level information acquisition unit 13 may use it as the attention level of the product. Furthermore, the attention level may be calculated for each word for which the attention level is acquired.

The purchase screen information acquisition unit 14 is a functional unit to acquire a purchase screen information displayed on the purchaser terminal by the mall management server 2. The purchase screen information acquisition unit 14 has a character information extractor 14a acquiring a source code of the purchase screen and an image extractor 14b included in the purchase screen. In particular, the purchase screen information acquisition unit 14 acquires at least information displayed as character information on the purchase screen in the source code. Further, the purchase screen information acquisition unit 14 may acquire a part indicating a display image from the source code, or may acquire an image data indicated by the display image.

On the purchase screen, a product name, a product description image, an advertisement of other products related to the product, reviews of the product, and seller information set as a default value, are displayed. However, the display of the purchase screen is created and edited by the mall management server 2, and is changed as needed for listing the same product by a new seller or for posting a review by the purchaser. Further, the advertisement of the other products is changed as needed for an entry of new advertisers, an investment of advertising expenses by existing advertisers, a change of images presented by the advertisers, and the like. Moreover, the purchase screen is a screen that the purchaser always browses when making any purchase decision, and is of high importance in terms of marketing. Therefore, according to the configuration in which the purchase screen information acquisition unit 14 acquires the purchase screen information, the purchaser may go back to confirm the screen browsed at a time of purchasing and can get a clear picture of a status when the purchaser made a purchase decision.

The purchase screen information acquisition unit 14 may periodically acquire information on the purchase screen, and when it detects that there is a change in the purchase screen, the purchase screen information acquisition unit 14 may notify the user terminal 4 connected via the network. The change in the purchase screen includes, for example, a change in a number of product images displayed on the purchase screen and a display order. According to the configuration in which the purchase screen is periodically acquired and information visually recognized by the purchaser is organized and presented, it can be immediately noticed when the information on the purchase screen is changed. In addition, the user of this system compares the changes in the information on the presented purchase screen with a number of visits, an average price, sales trends, a conversion rate and the like, to examine effects of the changes in the information on the presented purchase screen on the purchase status. The purchase analysis system 1 may notify the user terminal 4 when the purchase screen changes, or when the images are deleted or the display order is changed.

The information acquired by the trading history acquisition unit 11, the advertising information acquisition unit 12, the attention level information acquisition unit 13, and the purchase screen information acquisition unit 14, is stored in an acquisition information storage 1D.

The analyzer 15 is a functional unit to analyze based on the information acquired by the trading history acquisition unit 11, the advertising information acquisition unit 12, the attention level information acquisition unit 13, and the purchase screen information acquisition unit 14. The analyzer 15 analyzes the purchase status of the target product based on at least one of the trading history, the advertising indicators, the information on the Internet, and the purchase screen information. The analyzer 15, for example, calculates an advertisement cost effectiveness of the target product based on the trading history and the advertising indicators.

The result output unit 16 is a functional unit to output a result screen including analysis results. The result screen contains results analyzed based on the information acquired from at least two sources. Detailed analysis results and the result screen by the analyzer 15 and the result output unit 16 will be described later with reference to FIGS. 3 to 8.

The product information storage 1A is a functional unit to store information related to the product. The information related to the product includes, for example, a product name, product identification information, a product category, a selling price, and a cost price. Further, the information related to the product may include information on a brand to which the product belongs.

The wholesaler information storage 1B is a functional unit to store wholesaler information of the product. The wholesaler information includes, for example, a name of the wholesaler, identification numbers, contact information of the wholesaler, and the like. The wholesaler information and identification information of the product wholesaled to the wholesaler are stored in the wholesaler information storage 1B in association with each other. In addition to an aspect that the user of the system registers the wholesaler information, the wholesaler information storage 1B may acquire the seller information selling the target product from the purchaser screen presented by the mall style site, or a web site screen, which is transitioned to display from the purchaser screen and which is visually recognized by the purchaser. In this case, the seller may include the wholesaler wholesaled by the user of the system, as well as an unauthorized trader, for example, a reseller.

The advertising information storage 1C is a functional unit to store information related to an advertising invested by the user of the system. In the advertising information storage 1C, an investment cost and a type of the product to be advertised are associated with each other for each advertisement. The advertisement refers to, for example, an image, a video, a sound, or the like, and is managed by different identification information for each type of the image, the video, the sound, or the like.

The advertisement may be stored in association with a campaign to which the advertisement belongs. For example, one campaign contains multiple advertisements. According to such a configuration, the analyzer 15 can extract an indicator related to the advertisement for each campaign and analyze the advertising cost effectiveness of the target product. Further, a plurality of products may be associated with one advertisement. This is because it may contribute to sales for multiple products if multiple products are displayed in one advertisement, or if the advertisement contributes to the brand image or the corporate image instead of a specific product. Further, a contribution rate of the advertisement to the product may be stored for each product. In addition to the campaign, an advertisement group to which the advertisement belongs may be associated and stored.

Processing Flow

Figure 2:
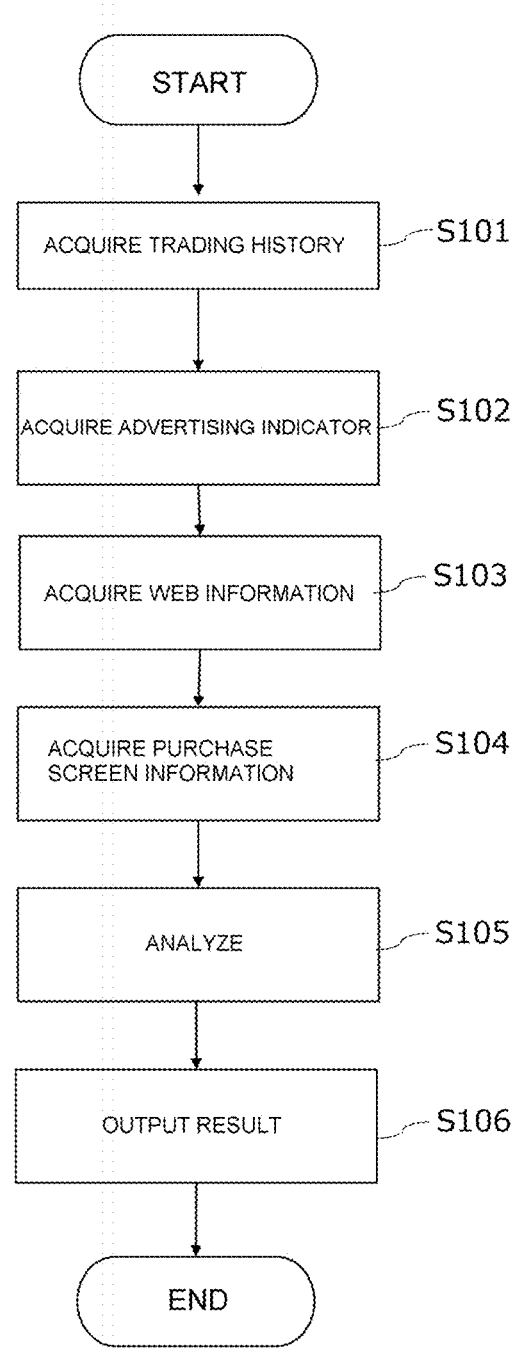
FIG. 2 is a processing flow illustrating an example of an analysis flow by the purchase analysis system mentioned above.

FIG. 2 is a flowchart illustrating an example of a flow of processing executed by the purchase analysis system 1. First, the trading history acquisition unit 11 acquires the trading history from the mall management server 2 (step S101). The advertising information acquisition unit 12 periodically acquires the ad indicators (step S102). The attention level information acquisition unit 13 periodically acquires information from the external server 3 (step S103). The purchase screen information acquisition unit 14 periodically acquires the purchase screen information (step S104). Steps S101 to S104 are in no particular order and may be executed at the same time. Further, execution cycles of each of the steps S101 to S104 may be different and may be synchronized or asynchronized. The acquisition of the trading history in step S101 may be executed when the trading is performed or may be periodically executed.

Next, the analyzer 15 analyzes the information acquired in the steps S101 to S104 (step S105). Then, the result output unit 16 outputs an analysis result screen (step S106).

An Example of Screen

Figure 3:
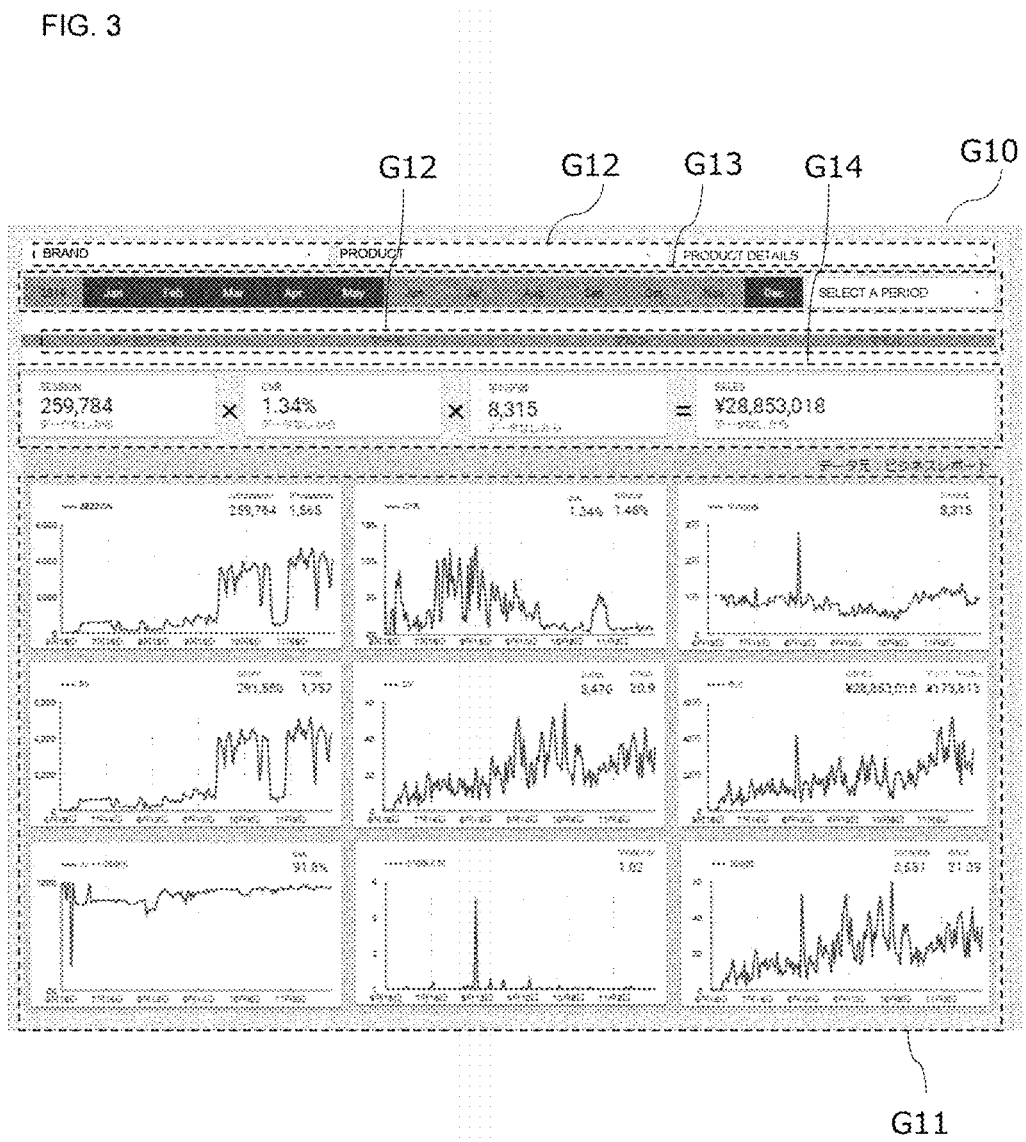
FIG. 3 is an example of a result screen displayed by the purchase analysis system mentioned above.

FIG. 3 is an example of an analysis result screen G10 displayed on the user terminal 4. In this analysis result screen G10, a graphing area G11, a product selecting area G12 for selecting a brand or a product to analyze, a period selecting area G13 for selecting a period to analyze, an analyzing area G14 for displaying the analysis results, and the like are displayed.

In the example of FIG. 3, a number of visits (a number of sessions), a conversion rate (CVR), an average selling price, a number of page views (PV), a number of conversions (CV), sales, a cart winning rate (a cart acquisition rate), an average number of purchases, and an average number of sales, for each product or brand selected in the product selecting area G12 are each displayed as a broken line graph in the graphing area G11. Moreover, each broken line graph is displayed on the same time axis. In the analyzing area G14, a result of calculating the CVR based on the number of sessions, a value multiplied by the average selling price, and total sales amount, is displayed.

In addition to or in addition to a part of the example in FIG. 3, an indicator of the attention level acquired by the attention level information acquisition unit 13, such as a number of searches on the search engines or a number of posts on a SNS, may be displayed on the same time axis as other indicators. According to this configuration, it becomes easy for the user of this system to consider an influence of the attention level outside the mall style site on the purchase.

In addition, by identifying an SNS that tends to affect purchasing, it is possible to plan an effective advertising strategy, such as focusing on advertising on the SNS.

Figure 4:
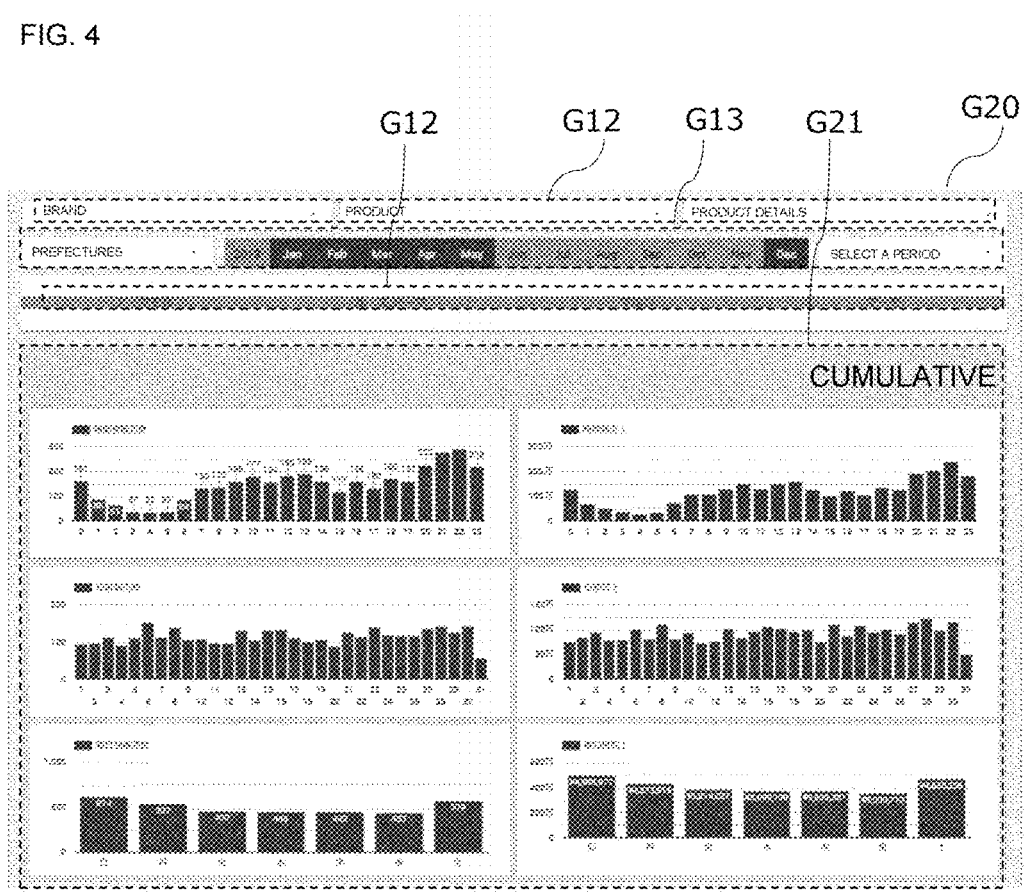
FIG. 4 is an example of a result screen displayed by the purchase analysis system mentioned above.

FIG. 4 is an example of an analysis result screen G20 displayed on the user terminal 4. In this analysis result screen G20, a graphing area G21, a product selecting area G22 for selecting a brand or a product to analyze, a period selecting area G23 for selecting a period to analyze, and the like are displayed. The same reference numerals are given to the same configurations as those of the analysis result screen G10. In the graphing area G21, a number of sales by hour, sales by time, a number of sales by day, daily sales, a number of sales by day of the week, sales by day of the week, and the like, for each product or brand selected in the product selecting area G12 are each displayed as a column chart in the graphing area G21. Although the number of sales and the total sales are displayed in cumulative totals in FIG. 4, graphs of average values may be displayed instead of or in addition to displaying the cumulative total.

Figure 5A:
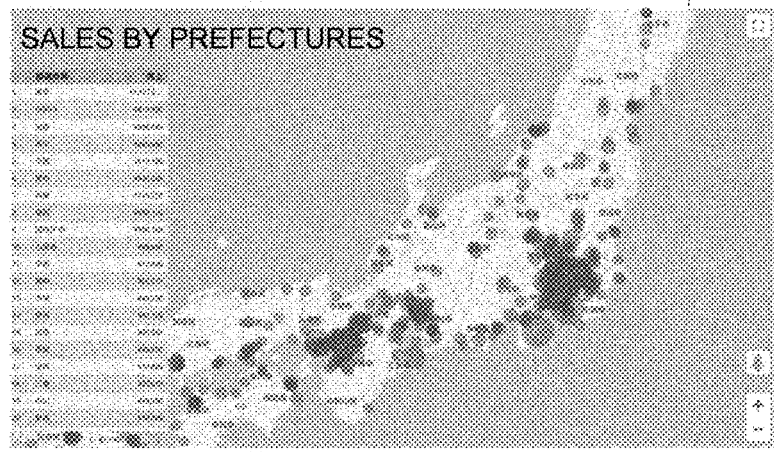
FIG. 5A is an example of a result screen displayed by the purchase analysis system mentioned above.
Figure 5B:
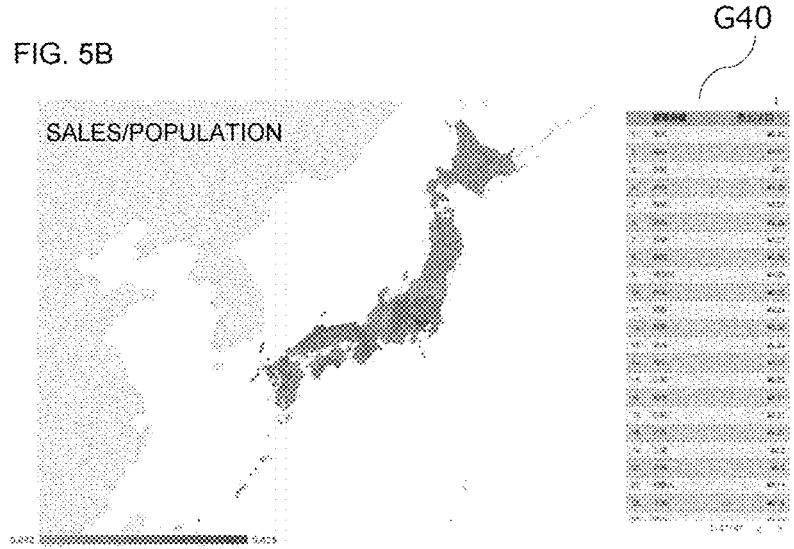
FIG. 5B is another example of a result screen displayed by the purchase analysis system mentioned above.

FIG. 5A is an example of an analysis result screen G30 displayed on the user terminal 4. In this analysis result screen G30, a sales amount is shown by a radar chart on a map based on information of the residential area of the purchaser included in a sales history. In addition, a table illustrating a ranking of prefectures with a largest sales amount is also illustrated. FIG. 5B is an example of an analysis result screen G40 displayed on the user terminal 4. The analysis result screen G40 displays sales per unit population obtained by dividing sales amount for each prefecture by a population of each prefecture on a map in color, and a table of a ranking of prefectures having a large amount of sales per unit population is displayed together.

Figure 6:
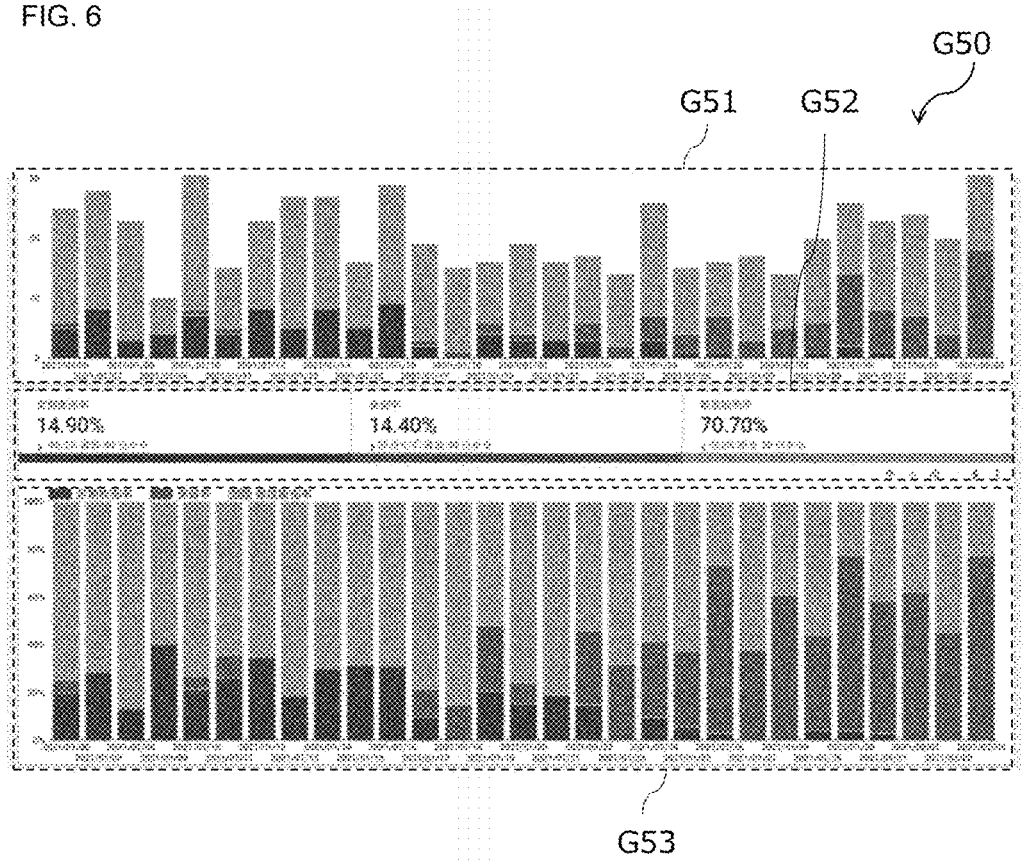
FIG. 6 is an example of a result screen displayed by the purchase analysis system mentioned above.

FIG. 6 is an example of an analysis result screen G50 displayed on the user terminal 4. In this analysis result screen G50, an area GM, an area G52, an area G53, and the like, are displayed. The area G51 cumulatively displays a number of sales by subscriptions, a hold amount, and a number of sales by one-off purchases, on a vertical bar graph of sales. The area G52 numerically displays a subscription rate, a hold rate, and a sales rate at one-off purchase rate, at a time of analysis. The area G53 displays a band graph with a length in a height direction as 100%, illustrating the subscription rate, the hold rate, and the one-off purchase rate.

Figure 7:
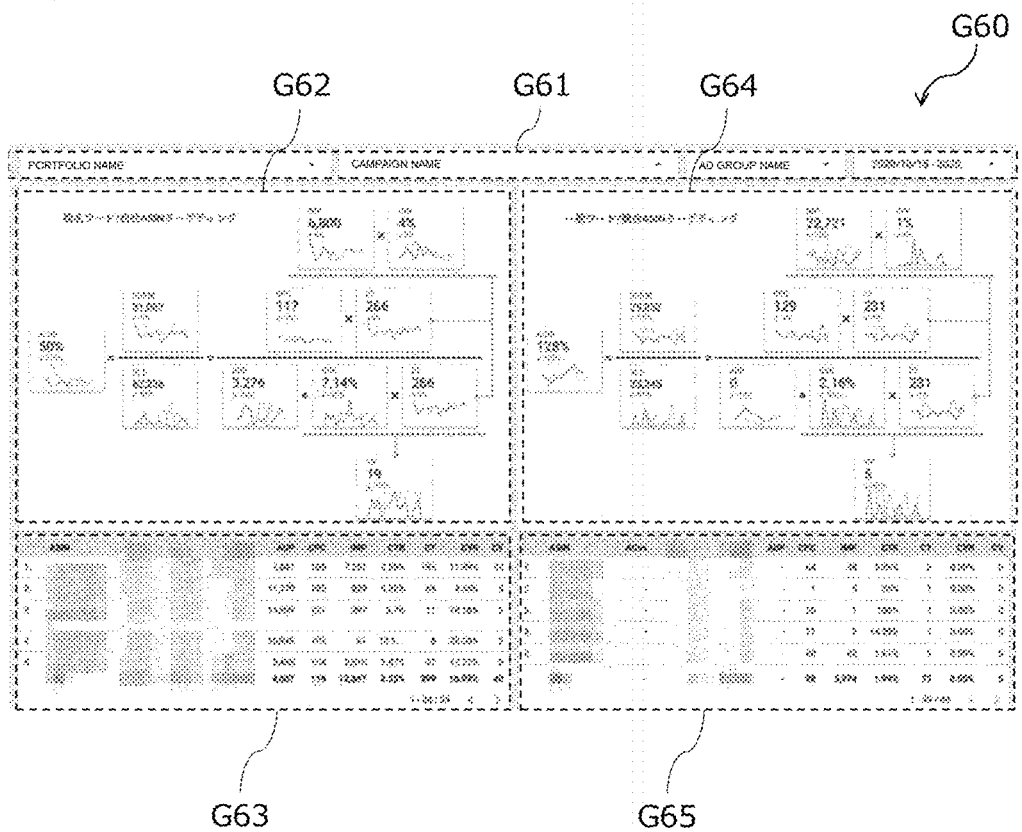
FIG. 7 is an example of a result screen displayed by the purchase analysis system mentioned above.

FIG. 7 is an example of an analysis result screen G60 displayed on the user terminal 4. In this analysis result screen G60, the analysis results of a cost effectiveness of the advertisement for the sales can be browsed. The analysis result screen G60 displays, for example, a selecting area G61 for selecting information to display, an indicator displaying area G62 for illustrating a relationship between each indicator as an indicator used for the sales advertisement rate and calculation, and an indicator list area G63 for illustrating a list of indicators for each product. In addition, the analysis result screen G60 illustrates an indicator displaying area G64 of a product different from the target product, and a different product indictor list area G65 for illustrating a list of indicators for each different product. The product different from the target product is, for example, a competing product by a competitor.

In the selecting area G61, a portfolio name, a campaign name, an advertising group name, a period, and the like to display is displayed in a selectable manner. By selecting the campaign name or the advertising group name by the selecting area G61, indicators related to the product belonging to the selected campaign or the advertising group is displayed in the indicator displaying area G62 and the indicator list area G63. In addition, it may be possible to select one advertisement in the selecting area G61.

In the indicator displaying area G62 and the indicator list area G63, an average price (AUP), a cost per click (CPC), a number of impressions (IMP), a click rate (CTR), a number of clicks (CT), a conversion rate (CVR), conversion (CV), and the like are displayed for each product. Further, it is clearly stated that a value obtained by multiplying CVR and CT is CV. In addition, it is clearly stated that a value obtained by multiplying IMP and CTR is CT. In the indicator displaying area G62, the sales amount obtained by multiplying AUP, CVR, and CT, is displayed. Further, the indicator displaying area G62 displays an advertising cost obtained by multiplying CPC and CT. Furthermore, an advertising cost of sales (ACoS or an indicator called ROAS), obtained by dividing the advertising cost by the sales, is displayed as "ACoS." Further, the rate at which each indicator has changed from the time of analysis to a predetermined time in the past is also displayed.

The advertising cost, CPC, IMP, CTR, CT and CVR displayed in the indicator displaying area G62 are indicators having different values depending on the selected campaign name or advertising group name. According to such a configuration, it is possible to analyze an advertisement effectiveness for each of a type of the advertisement, a campaign, or an advertising group. Moreover, since a change rate of the indicator is clear at a glance, it is possible to understand a change in the purchase status due to the advertisement.

FIG. 8 is an example of an analysis result screen G70 displayed on the user terminal 4. In this analysis result screen G70, images acquired from the purchase screen are displayed at each point of time acquiring. In the example of FIG. 8, it can be noticed that an image of a sub-image (3) is deleted by the manager of the mall style site between a time point of an Information ID 3 to an Information ID 2. Further, between a time point of the Information ID 2 to an Information ID 1, a display order of a sub-image (1) and a sub-image (2) is exchanged.

As described above, according to the configuration in which the purchase screen is periodically acquired and the information visually recognized by the purchaser is organized and presented, it is possible to immediately notice a change in the information on the purchase screen.

According to the purchase analysis system according to the embodiment of the present invention, it is possible to analyze the purchase status and the like from various kinds of information regarding the products displayed on the mall style shopping site.

In the purchase analysis system according to the present embodiment described above, the functional configuration of each terminal or unit is an example, and the functional units described in this example may be provided in a terminal or unit different from this example.

REFERENCE SIGNS LIST

1 purchasing analysis system
11 trading history acquisition unit
12 advertising information acquisition unit
13 attention level information acquisition unit
14 purchase screen information acquisition unit
15 analyzer
16 result output unit
17 communication processor
1A product information storage
1B wholesaler information storage 1C advertising information storage
1D acquisition information storage
2 mall management server
3 external server
4 user terminal

The invention claimed is:

1. A computer-based purchasing analysis system configured to communicatively connect through the Internet to a user terminal having a user terminal display, to a mall management server that is separate from the user terminal and hosts a mall style shopping site and manages sales of a target product on the mall style shopping site, the sales being via the Internet to purchasers at respective purchaser terminals connected to the Internet, and to an external server that is separate from the mall management server and the user terminal and manages one or more Internet search engines, and to other servers, the system comprising a computing device connected to a memory comprising a non-transitory memory storing a computer-executable program that when executed causes the computing device to perform according to functional units comprising:

a communication processor unit configured to interface and to communicate via the Internet;

a trading history acquisition unit configured to acquire, via the Internet using the communication processor unit, from the mall management server a trading history information comprising dates and times of purchases of the target product on the mall style shopping site by the purchasers using the respective purchaser terminals;

an attention level information acquisition unit configured to:

acquire, via the Internet using the communication processor unit, from the external server that manages one more Internet search engines, an attention level information and a point of time associated with the attention level information, the attention level information indicating a number of Internet searches on the one or more Internet search engines for information related to the target product, and acquire from an Internet accessible other external server which hosts a social networking service, via the Internet using the communication processor unit, additional attention level information that is indicative of an attention level of the target product on the social networking service, the additional attention level information comprising numbers of searches for information related to the target product on search engines or numbers of posts by general consumers with times of day;

an advertising information acquisition unit configured to acquire, via the Internet using the communication processor unit, from the mall management server or from the other servers or from both, of advertising indicators of the target product, and a point of time associated with the advertising indicators, wherein the advertising indicators comprise a number of impressions or a click rate, or both, of advertisements of the target product posted on the mall management sever or posted on sites on the other servers; and a result output unit configured to:

provide on the display of the user terminal, via the Internet, an analysis result screen configured as a user selectable displaying, on a same time axis, of graphics based on the trading history information and the advertising indicators, and of graphics based on the attention level information and the trading history information, and configure, on the display of the user terminal, selecting areas to enable user selection of displaying of selectable portions of the additional attention level information and portions of the trading history information on a respective same time axis.

2. The computer-based purchasing analysis system according to claim 1, wherein the advertising information acquisition unit is further configured to acquire the advertising indicators according to a timing, and the trading history acquisition unit is further configured to acquire the trading history information according to the same timing as the advertising information acquisition unit.

3. The computer-based purchasing analysis system according to claim 1, wherein the result output unit is further configured to display the additional attention level information and the advertising indicators on the same time axis.

4. The computer-based purchasing analysis system according to claim 1, wherein the attention level information acquisition unit is further configured to acquire the attention level information to include an acquiring of an attention level of various words on the Internet corresponding to the target products and to perform a calculating of the attention level for each of the various words.

5. The computer-based purchasing analysis system according to claim 1, wherein:

the trading history acquisition unit is further configured to include in the acquiring of the trading history information from the mall management server via the Internet using the communication processing unit, an acquiring from the mall management server of an information indicating residential areas of the purchasers of the target product, and the result output unit is further configured to determine and to display, on the user terminal via the Internet, a sales amount of the target product for each region among a plurality of regions, based on the information indicating the residential areas of the purchasers of the target product included in the trading history information.

6. The computer-based purchasing analysis system according to claim 1, wherein the functional units further comprise an analyzer unit configured to perform a calculating of an advertisement cost effectiveness of the target product based at least in part on the trading history information acquired from the mall management server and the advertising indicators acquired from the mall management server or acquired from at least one of the other servers connected to the Internet, or acquired from both.

7. The computer-based purchasing analysis system according to claim 6, wherein the functional units further comprise an advertising information storage unit, which is configured to store, in the memory of the computer device, an advertisement of the target product, wherein:

the advertising information storage unit is further configured to store the advertisement of the target product in association with a campaign to which the advertisement belongs, and the analyzer unit is further configured to perform an extracting of the advertising indicators and to perform the calculating of the advertisement cost effectiveness of the target product for each of the campaign.

8. A computer-based purchasing analysis method for computer connection, via the Internet, to a user terminal connected to the Internet, to a mall management server connected to the Internet, to an external server connected to the Internet and storing advertising indicators, and to another external server connected to the Internet and storing attention level information, for analyzing on a same time axis for display, via the Internet, on a display screen of the user terminal, of a relation between Internet advertising of a target product and sales of the target product on the mall style shopping site to purchasers accessing the-mall management server using respective purchaser terminals connected to the Internet, the method comprising the computer-executed steps of:

the computer acquiring from at least the mall management server, via the Internet, a trading history information comprising dates and times of the purchases of the target product on the mall style shopping site by the purchasers using the respective purchaser terminals;

the computer acquiring, via the Internet, from the mall management server or from other external servers connected to the Internet, or from both, advertising indicators of the target product and a point of time associated with the advertising indicators, wherein the advertising indicators comprise a number of impressions or a click rate, or both, of advertisements of the target product;

the computer acquiring, via the Internet, from an external server that manages one more Internet search engines, an attention level information and a point of time associated with the attention level information, wherein the attention level information indicates a number of Internet searches on the one or more Internet search engines for information related to the target product;

the computer acquiring from an Internet accessible other external server which hosts a social networking service, via the Internet using the communication processor unit, additional attention level information that is indicative of an attention level of the target product on the social networking service, the additional attention level information comprising numbers of searches for information related to the target product on search engines or numbers of posts by general consumers with times of day;

the computer displaying, via the Internet, on the display screen of the user terminal the trading history information acquired from the mall management serve, on a time axis and the advertising indicators acquired via the network, on a time axis that is the same as the time axis of the displaying of the trading history information; and the computer configuring, on the display screen of the user terminal, selecting areas to enable user selection of displaying of selectable portions of the additional attention level information and portions of the trading history information on a respective same time axis.

9. A non-transitory computer-readable storage medium that stores a computer-executable program for acquiring purchase status information and analyzing purchase status of a target product sold on a mall style shopping site hosted by a mall management server that is connected to the Internet, the program comprising:

instructions that when executed cause a computing device to perform an acquiring, via the Internet, of information from the mall management server related to a trading history of the target product on the mall style shopping site;

instructions that when executed cause the computing device to acquire, via the Internet, from the external server that manages one more Internet search engines, an attention level information and a point of time associated with the attention level information, the attention level information indicating a number of Internet searches on the one or more Internet search engines for information related to the target product;

instructions that when executed cause the computing device to acquire from an Internet accessible other external server which hosts a social networking service, via the Internet using the communication processor unit, additional attention level information that is indicative of an attention level of the target product on the social networking service, the additional attention level information comprising numbers of searches for information related to the target product on search engines or numbers of posts by general consumers with times of day;

instructions that when executed cause the computer device to perform an acquiring, via the Internet, from the mall management server or from other servers connected to the Internet, or from both, of advertising indicators of the target product and a point of time associated with the advertising indicators, wherein the advertising indicators comprise a number of impressions or a click rate, or both, of advertisements of the target product;

instructions that when executed cause the computing device to perform a displaying, on a display screen of a user terminal connected to the Internet, of the information related to the trading history and the advertising indicators on a same time axis; and instructions that when executed cause the computing device to configure, on the display screen of the user terminal, selecting areas to enable user selection of displaying of selectable portions of the additional attention level information and portions of the trading history information on a respective same time axis.

* * * * *